United States Patent [19]

Hendershot

[11] 4,407,598

[45] Oct. 4, 1983

[54] TIMING HUB

[75] Inventor: Robert V. Hendershot, Evanston, Ill.

[73] Assignee: Troika Corp., Evanston, Ill.

[21] Appl. No.: 320,449

[22] Filed: Nov. 12, 1981

[51] Int. Cl.³ .............................................. F16D 1/00
[52] U.S. Cl. ...................................... 403/4; 403/337; 403/269
[58] Field of Search ...................... 403/4, 3, 337, 336, 403/335, 269, 267

[56] References Cited

U.S. PATENT DOCUMENTS

| | | | |
|---|---|---|---|
| 439,981 | 11/1890 | Stewart | 285/84 X |
| 1,057,928 | 4/1913 | Briggs | 403/183 X |
| 1,109,836 | 9/1914 | Hanson | 403/4 |
| 1,177,638 | 4/1916 | Larson | 403/97 |
| 1,307,160 | 6/1919 | Stokes | 403/97 |
| 1,720,422 | 7/1929 | Manville | 403/4 |
| 4,357,913 | 11/1982 | Hori et al. | 403/337 |

*Primary Examiner*—Andrew V. Kundrat
*Attorney, Agent, or Firm*—McCaleb, Lucas & Brugman

[57] ABSTRACT

A simple, adjustable shaft coupling employed for accurately advancing or retarding the timing of shafts, sprockets, cams, gears, levers and the like made up of a pair of annular disks, each fixed to a hub member by injection molding or a similar process to effect integration of parts, each disk having a plurality of openings therethrough with the number of openings in the two disks differing. Alignment of matching sets of openings in the two disks provides desired rotational adjustment therebetween. In the particular model described a total of 544 locking positions, producing adjustment accuracy in the order of 1/6 or 1°, is available. The hub members are interferingly anchored to the disks and are capable of attachment to input or output shafts and provide for optional face mounting thereto of gears, sprockets, cams and the like.

7 Claims, 7 Drawing Figures

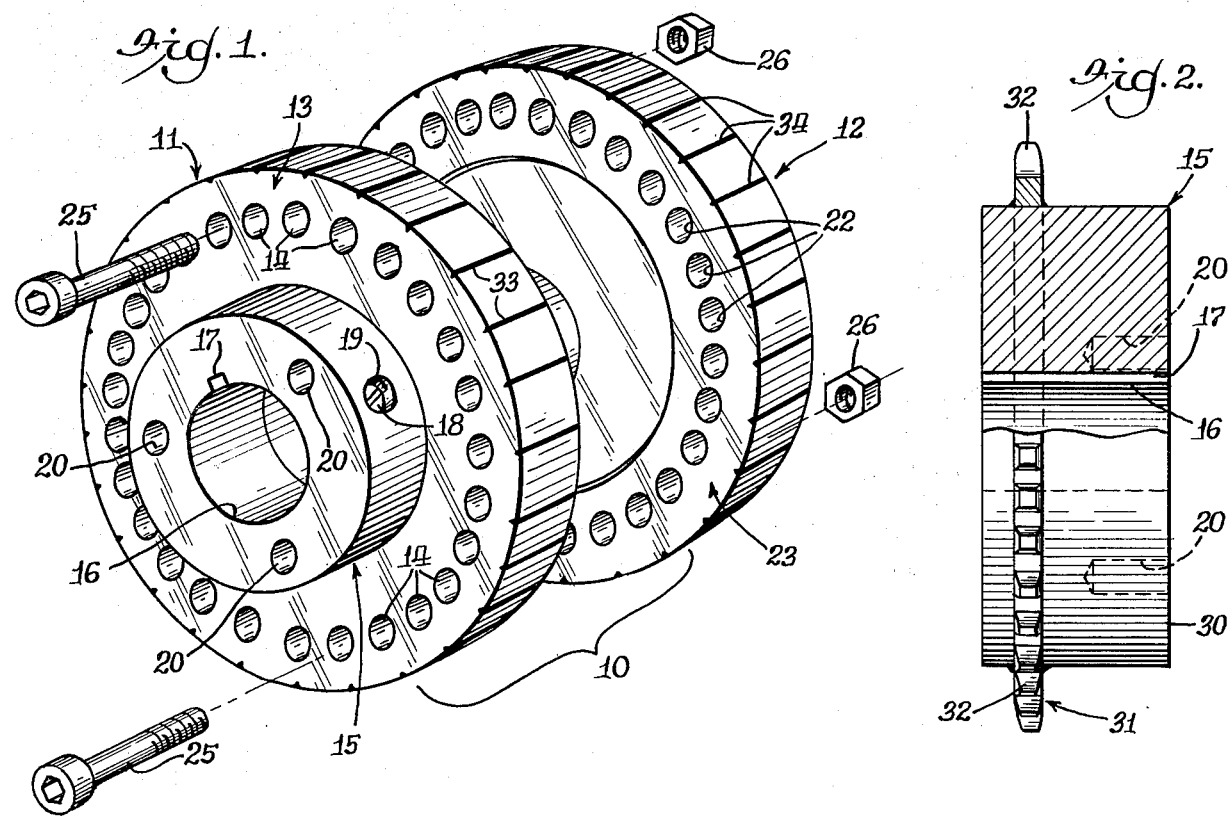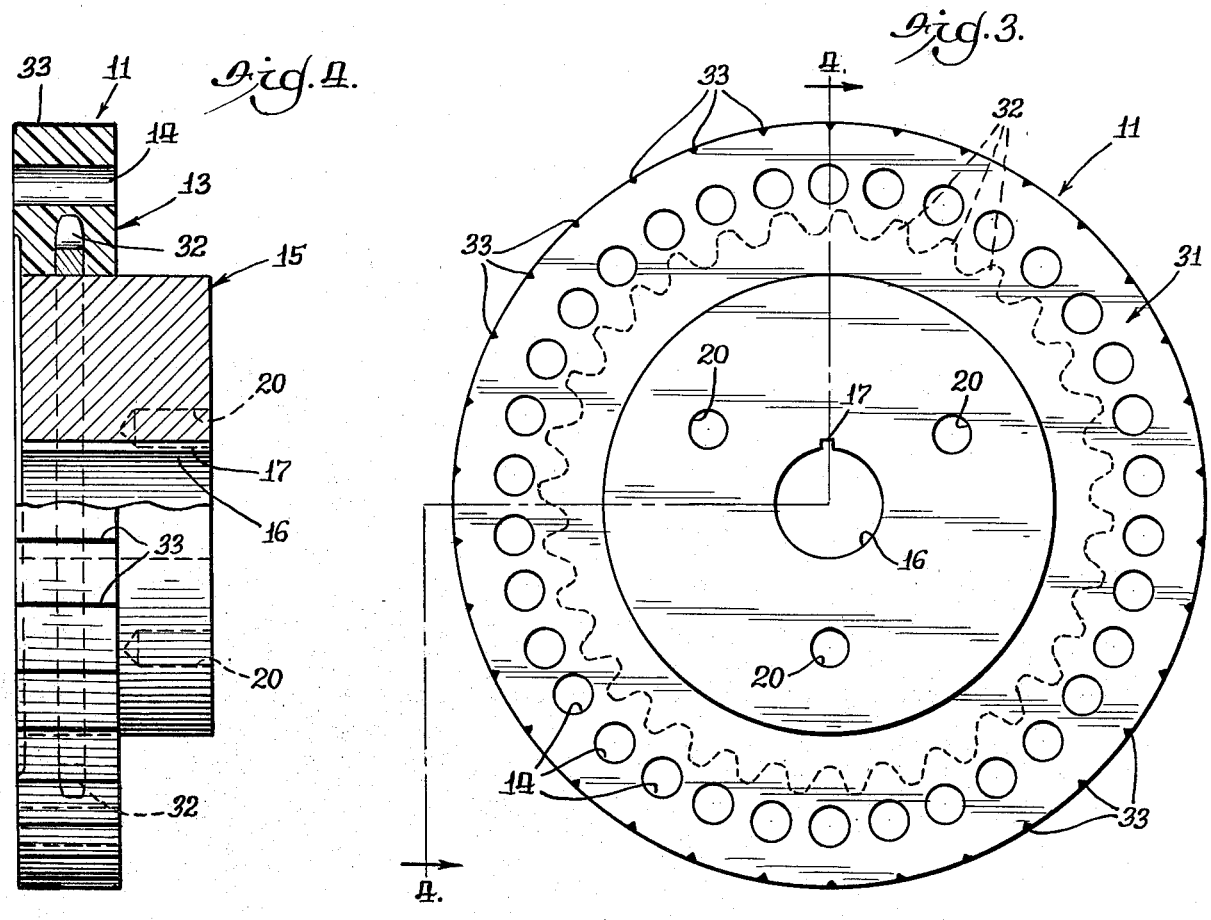

TIMING HUB

This invention relates to an improved coupling or connecting device for interjoining substantially coaxially aligned shafts and includes a simplified means to time or relatively position shafts, sprockets, gears, timing belts and like devices by incrementally adjusting cooperating portions of the coupling.

The most common method currently in use for repositioning or timing gears, sprockets and the like is either to provide a combination of slots and clamps for securing them to a shaft or to mill plural fixed keyways and slots in the gear, etc. for cooperation with locking keys to fit the same in desired positions on a shaft. Both of these approaches to the problem are subject to wear, slippage or loss of adjustment while entailing costly labor, expense and time and affording relatively limited adjustability.

Typifying the prior art, are the following U.S. Pat. No. 439,981 issued Nov. 4, 1890; No. 1,057,928 issued Apr. 1, 1913; No. 1,177,638 issued Apr. 4, 1916; and No. 1,307,160 issued June 17, 1919.

The present invention provides an improved structural arrangement of parts for a timing hub or coupling which is positive in its action, provides desired incremental rotational adjustment of one shaft or coupling part relative to another and is characterized by improved economies of manufacture and assembly.

An important object of this invention is to provide an improved timing hub structure in which a pair of annular disks are provided with a plurality of openings for the reception of fasting means therethrough; the disks having different numbers of openings to effect a desired incremental rotational relationship of adjustment therebetween in assembly; such openings being produced by an injection molding process for accurate alignment, size, economy and ease of manufacture.

Still another object of this invention is to provide an improved timing hub or shaft coupling, as aforesaid, wherein the adjustable disks are positively integrated with a hub member disposed coaxially of the disk, by and with the molding of the disk thereabout.

The above and further objects, features and advantages of this invention will be recognized by those familiar with the art from the following detailed description of preferred and modified embodiments thereof, illustrated in the accompanying drawings and representing the best mode presently contemplated for enabling others to make and practice this invention.

IN THE DRAWINGS

FIG. 1 is an exploded perspective view of a coupling assembly in accordance with this invention;

FIG. 2 is a side elevational view with portions in section of a first form of hub member employed in the coupling illustrated in FIG. 1;

FIG. 3 is a front elevational view of a coupling member shown in FIG. 1; and employing the hub member of FIG. 2;

FIG. 4 is a partial cross-sectional view taken substantially along vantage line 4—4 of FIG. 3.

DESCRIPTION OF THE PREFERRED EMBODIMENT

Figure 6:
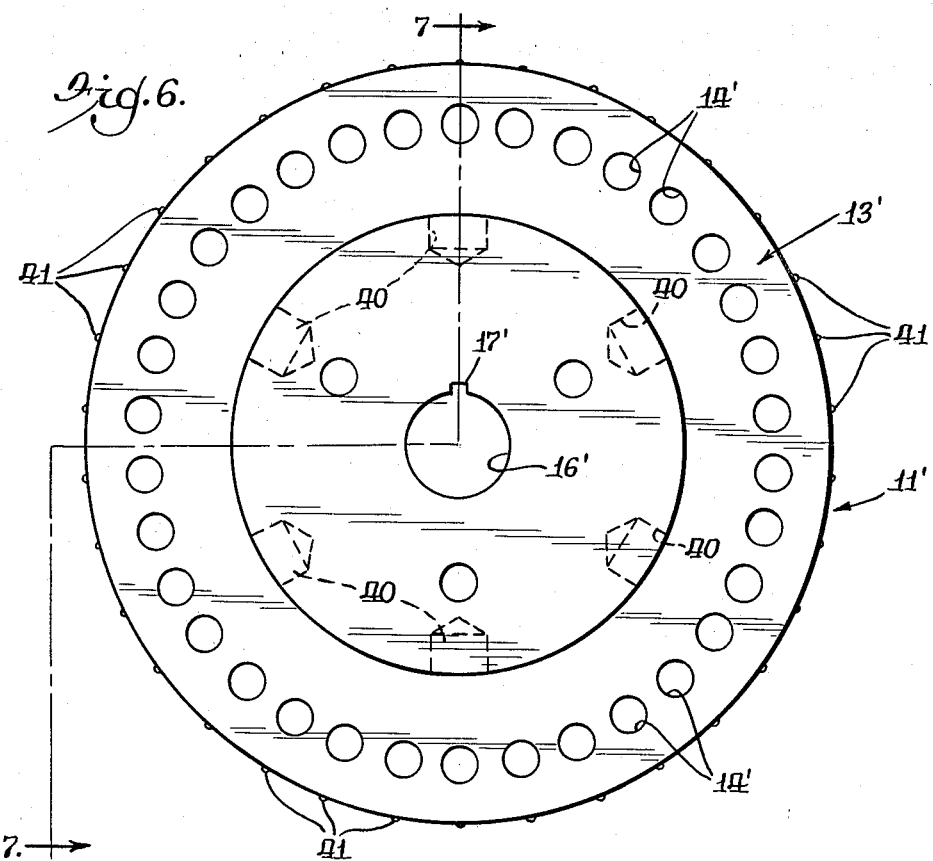
FIG. 6 is a view in front elevation of a coupling member employing the modified hub member of FIG. 5.

Turning now to the specifics of the preferred embodiment illustrated in FIGS. 1-4 of the drawings, particular reference is made to FIG. 1 showing a coupling assembly 10 made in accordance with this invention as comprising a pair of cooperating coupling members 11 and 12 of identical structure.

Specifically, coupling member 11 comprises an annular disk portion 13 having a plurality of adjustment openings 14 therethrough and affixed about the periphery of a central cylindrical hub member 15 having a coaxial shaft opening 16 which is provided with a keyway slot 17 and an invading lock screw 18 movable in a threaded opening 19 formed radially of the hub member 15. A plurality of tapped openings 20 are provided in the end face of the hub member 15 for acceptance of tap screws and the like for face mounting gears, sprockets, sheeve wheels, cranks, levers, cams and the like thereon.

The structural makeup of the coupling member 12 is identical to that described for coupling member 11 except that the openings 22 formed through the annular disk portion 23 thereof differ in number from the openings 14 formed through the disk portion 13.

A pair of fasting bolts 25, 25, each cooperative with a nut member 26 are provided for passage through diametrically opposite pairs of cooperating and aligned openings 14 and 22 in operation whereby to positively interjoin the coupling members 11 and 12 in operation.

Turning now to the novel features of the two coupling members 11 and 12, it will be understood that since their structural makeup is identical except for the number of openings provided in their respective disk members 13 and 23, a description of coupling member 11 will suffice for both.

As best shown in FIG. 2 of the drawings, a hub member 15, associated with each of the coupling members 11 and 12, comprises a generally cylindrical body portion 30 having a central cylindrical opening 16 therethrough which is receptive of a shaft that is normally keyed and locked thereto, as previously noted. In general, member 15 is preferably of steel or like metal of substantial strength and rigidity and is distinguished by peripheral connective means comprising an annular toothed member or ring 31 having a plurality of separated teeth 32, surrounding the body portion 30 (see FIGS. 2 and 3). Member 31 has an internal diameter to fit snugly about the exterior of the body portion 30 or such may be formed integrally therewith. If the toothed member 31 is formulated separately of the hub body portion, then it is fixed in place adjacent one end of the latter as by welded connection.

The subassembly illustrated in FIG. 2, is adapted for unification with a disk member such as disk 13, by molding the latter in situ with the hub member and toothed member, during an injection molding process. To this end, the disk member 13 preferably is cast of metal or of a plastic material having relatively high strength and adapted for injection molding. One such material found satisfactory for this purpose is commercially obtainable from DuPont, designated Rynite 555, and comprising a glass-filled polyester material. By selecting an injection molding program for formulating the disk members, unification thereof with and about the subassembled hub and toothed members is readily brought about with marked economies of production, accuracy and simplicity. The accuracy factor is particularly important inasmuch as it is necessary to accurately formulate the plural openings 14 through the disk member as previously described. The size and location of such openings 14 is readily accomplished by injection molding as opposed to machining such openings in a time-consuming and laborious operation. In any event, the disk member is unified with the hub member preferably in the manner described with the various teeth 32 of the toothed member positively invading and anchoring the plastic disk member to the hub 15 thereby preventing relative rotation and movement therebetween.

It is to be noted that the exterior periphery of each disk member is provided with index means formed as a series of scribed or raised markings, each of which is aligned radially with the center of an opening 14 or 22, as applicable. These markings assist in the alignment of opposite pairs of openings 14 and 22 in the two disk members. Such scribe markings are indicated in FIG. 1 by numeral 33 on disk 13 and 34 on disk 23. The assembled product of the disk and hub member of FIG. 2 is illustrated best in FIG. 4 of the drawings with the elevational configuration thereof best shown in FIG. 3 to demonstrate the desired integration of parts.

In order to effectuate the desired and necessary differential in the number of openings through each of the disk members 13 and 23, disk 13 (termed the "front" disk) is provided with thirty-four openings 14, evenly spaced at precise circumferential locations thereabout. Correspondingly, disk 23 (termed the "back" disk) is provided with thirty-two openings 22 in the illustrated case. With this arrangement, five hundred and forty-four locking positions for the two coupling members 11 and 12 are provided with the maximum error of adjustment therebetween constituting roughly 20 minutes or $\frac{1}{3}$ of 1° and the minimum error constituting zero or exact positioning. This produces an average accuracy of substantially 1/6 of 1° for the rotational adjusted positions of the two coupling members. Thus, a coupling made up in accordance with the current invention provides very good position alignment accuracy of its adjustable movements and in fact usually provides greater alignment accuracy than the machine drive with which the same is used.

Figure 7:
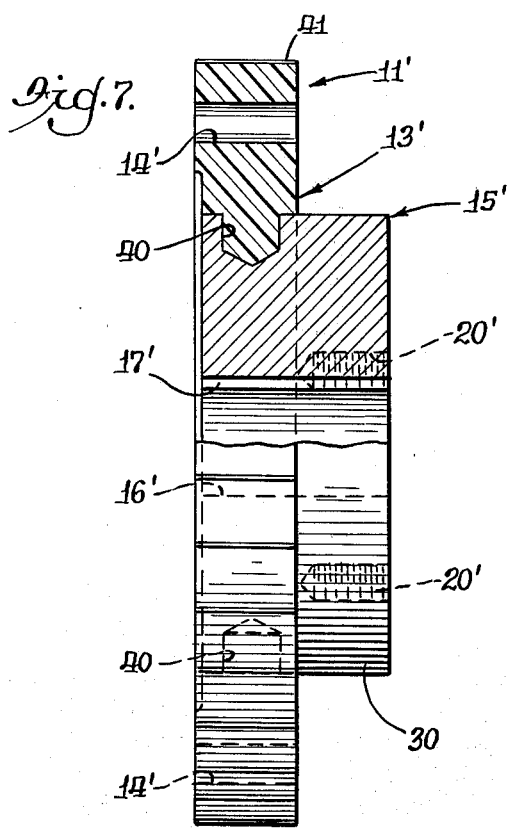
FIG. 7 is a cross-sectional view taken substantially along vantage line 7—7 of FIG. 6.
Figure 5:
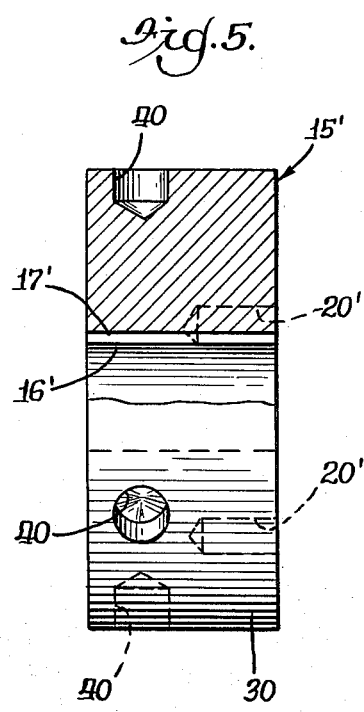
FIG. 5 is a side elevational view with portions in section of a modified hub member.

Turning now to the features of the modified hub member 15' illustrated in FIGS. 5–7 of the drawings, it will be understood that the same comprises a cylindrical metal body 30' having a central shaft receptive opening 16' with keyway 17' and mounting screw openings 20' as in the construction of hub 15 first described. Departure from the hub member of FIG. 2 is in the connective means employed for integrating the same with the disk portion of the coupling member 11'. In this instance, instead of a toothed ring member as described previously a plurality of circumferentially spaced sockets 40, bored inwardly of the periphery of the hub body 30' are provided. Thus, upon integration with a cast disk portion 13' (see FIGS. 6 and 7) the fluid metal or plastic used to form the disk flows into sockets 40 to connectively integrate the hub 15' with the disk portion 13' (see FIG. 7).

As in the first described form of coupling assembly 10, two individual coupling members, such as member 11' illustrated in FIGS. 6 and 7 are employed, each having a cast disk portion, such as disk portion 13' shown, are provided with plural openings, such as openings 14', for adjustable interconnection by the connective bolt and nut means 25 and 26. It also will be recalled that the disk portions 13 and 23 of the first described coupling assembly were provided with peripheral scribe marks 33 and 34 to assist in the alignment of diametrically opposite pairs of openings 14 and 22 in the adjustment of the coupling. In a similar manner, the modified disk portion 13' is provided with raised ridges 41 about its periphery, one opposite each of the position openings 14' therethrough.

In typical areas of use and operation, a coupling assembly 10 is positioned between coaxially aligned input and output shafts as a rigid coupling which, however, is capable of advancing or retarding the rotational position of the output shaft, for example. As noted above, with the 32/34 hole ratio of adjustment, average rotational positioning of the output shaft can be achieved to an accuracy of roughly 1/6 of 1°. It is to be noted that in each position of angular adjustment by and between the two disks and coupling members, there are always two sets of aligned holes in the opposing disk members for passage of the two locking bolts 25, 25; such two aligned sets of holes being diametrically opposite to insure strength and rigidity of the connective function for the coupling as immediately provided by the bolt members 25 and their locking nuts 26.

In other modes of use, the back disk 23, for example, may be used to carry a sprocket member of a chaindrive system by face mounting the sprocket member to the outer end of the hub portion of member 12, utilizing the mounting openings 20, 20 for that purpose. Likewise, the hub of either of the coupling members may receive plate cams, gears and the like. If it is desired to avoid face mounting of a gear, cam, etc., such may be mounted on a stub shaft inserted in the central opening of either the coupling members and keyed or set screw locked thereto, as before noted. With such an arrangement, by removing the bolts 25, the front or back disk, preferably the back disk on the input side of the coupling, may be rotated as desired to adjust its angular position relative to the output shaft carried in the front coupling member.

Having thus described this invention, it is believed that those familiar with the art will readily understand and appreciate its novel aspects and advancements over prior known devices of this general character and further will recognize that while this invention has been herein described in conjunction with an examplary preferred form thereof, illustrated in the accompanying drawings and described in the foregoing specification, the same is nevertheless susceptible to variation modification and substitution of equivalents without necessarily departing from the spirit and scope of the invention as defined in the following appended claims.

The embodiments of the invention in which an exclusive property or privilege is claimed are defined as follows:

1. A rotatably adjustable shaft coupling having a pair of coupling members for timing adjustment of input and output shafts joined thereto, comprising: a pair of hub members, each having means for connection with a shaft; connective means at the periphery of each hub member, an annular disk member cast about and thereby integrated with each said hub member and said connective means thereof and having a plurality of arcuately spaced openings therethrough; the number of openings in one disk member differing by at least two from the number of openings in the other disk member whereby to provide a differential in rotational positions of adjustment therebetween when two diametrically opposed openings in one disk member are coaxially aligned with corresponding openings in the other disk member; and connective means receptive in said aligned openings for positively coupling said disk members in face to face relationship whereby to rotatably adjust and join the input and output shafts connected to said hub members.

2. The combination of claim 1 wherein said connective means comprises an annular toothed member extending from the periphery of said hub member and having a plurality of radially protruding teeth thereon for invading the material of the disk member cast thereabout.

3. The combination of claim 1 wherein said connective means comprises a plurality of circumferentially spaced sockets extending radially inwardly of the periphery of said hub member and receptive of invading portions of a disk member cast thereabout.

4. The combination of claim 1 and index means on the periphery of each disk member in radial alignment with the center of each opening thereof for visually assisting in the coaxial alignment of openings of the two disk members.

5. The combination of claim 1 and means on each hub member for the face mounting of gears, sprockets, cams and like items to be rotatably advanced and retarded with the rotational alignment of the coupling members.

6. The combination of claim 1 wherein said disk members are of plastic material capable of being molded about said connective means and hub member.

7. The combination of claim 1 wherein said one disk member has 32 openings therethrough and said other disk member has 34 openings therethrough to provide an average accuracy of alignment for the rotational interpositioning of said coupling members in the order of 1/6 of 1°.

* * * * *